United States Patent
Austin

[11] Patent Number: 6,109,296
[45] Date of Patent: Aug. 29, 2000

[54] DRIBBLE FLOW VALVE

[76] Inventor: Cary M. Austin, 6218 21st St., Lubbock, Tex. 79407

[21] Appl. No.: 09/243,730

[22] Filed: Feb. 1, 1999

Related U.S. Application Data

[63] Continuation-in-part of application No. 08/886,905, Jul. 2, 1997, Pat. No. 5,988,984, which is a continuation-in-part of application No. 08/427,448, Apr. 24, 1995, abandoned, which is a continuation-in-part of application No. 08/103,340, Aug. 6, 1993, abandoned.

[51] Int. Cl.$^7$ ................................................. F16K 31/126
[52] U.S. Cl. ...................... 137/513.5; 251/61.1; 251/28; 137/488
[58] Field of Search ................... 37/513.5, 573.3, 37/488, 492.5; 251/61.1, 61.4, 28

[56] References Cited

U.S. PATENT DOCUMENTS

| | | | |
|---|---|---|---|
| 2,111,991 | 3/1938 | Richard | 137/513.5 |
| 3,050,086 | 8/1962 | Honsinger | 137/513.5 |
| 3,550,614 | 12/1970 | Englund et al. | 137/513.5 X |
| 3,782,858 | 1/1974 | Deters | 417/26 |
| 3,814,543 | 6/1974 | Gritz | 417/26 |
| 4,026,513 | 5/1977 | Callenberg | 137/513.3 X |
| 4,364,411 | 12/1982 | Payton et al. | 137/513.5 |
| 4,376,523 | 3/1983 | Goyen | 251/61.1 |
| 4,715,578 | 12/1987 | Seltzer | 251/61.1 X |
| 4,722,481 | 2/1988 | Lemkin | 137/513.5 X |
| 4,744,388 | 5/1988 | Ariizumi et al. | 251/61.1 X |
| 4,762,309 | 8/1988 | Hutchins | 137/513.5 X |
| 5,060,630 | 10/1991 | Boals | 137/513.5 X |
| 5,312,083 | 5/1994 | Ekman | 137/513.5 X |
| 5,383,646 | 1/1995 | Weingarten | 251/61.1 |
| 5,406,978 | 4/1995 | Smolong | 137/513.5 X |
| 5,464,064 | 11/1995 | Weingarten | 169/22 |

*Primary Examiner*—Kevin Shaver
*Assistant Examiner*—John Bastianelli
*Attorney, Agent, or Firm*—Wendell Coffee; Mark Scott

[57] ABSTRACT

A water system uses a pressure reservoir of extremely small size. A valve device is placed between a water pump and the pressure reservoir. The valve device has a constant outlet pressure function to limit the flow from the pump at high pressures. The pump is turned on and off responsive to a pressure on/off switch located down stream of the valve device. The valve device maintains the pressure to the reservoir below the off switch pressure except for a dribble flow. The dribble flow fills the reservoir when there is little or no water usage from the reservoir. The dribble flow is achieved by a notch or groove in the valve surfaces of the valve device. Each time the valve opens any debris in the notch or groove is washed from the notch or groove thereby keeping the notch or groove free of debris.

16 Claims, 2 Drawing Sheets

DRIBBLE FLOW VALVE

CROSS REFERENCE TO RELATED APPLICATION

This is a continuation in part of my prior application on this subject matter filed Jul. 2, 1997, Ser. No. 08/886,905 now U.S. Pat. No. 5,988,984 issued on Nov. 23, 1999 which was a continuation in part of my application filed Apr. 24, 1995, Ser. No. 08/427,448 (now abandoned) which was a continuation in part of my application filed Aug. 6, 1993, Ser. No. 08/103,340 (now abandoned). Specific reference is made to the above documents.

BACKGROUND OF THE INVENTION (1) Field of the Invention

This invention relates to liquid pumps and liquid systems and more particularly to a valve and system to prevent a motor driving a liquid pump from cycling, that is quickly and repeatedly turning off and on. Owners and operators of water systems have ordinary skill in the art of this invention.

(2) Description of the Related Art

Many water pumps supply water to a system having irregular, intermediate use. Often these water pumps supply water into a small reservoir such as a pressure tank. Water systems normally have a range of operating pressures. For example, the range of water of pressures is set between 40 and 60 p.s.i. This pressure range is normally achieved with a pressure switch which cuts off the motor to the pump at 60 p.s.i., which is a second preset condition and then turns it on at a pressure of 40 p.s.i., which is a first preset condition. If the use is such that the small pressure tank is quickly drained, the motor is switched on, the pump fills the pressure tank quickly, the pump switches off, and then as the tank is quickly drained, the pump switches on again. Most of the wear and damage to the motors and the pumps is caused by the numerous repeated starts and stops of the system.

Such a system as described is common on residential water supplies having a separate water supply for every residence, as often occurs in rural areas. Also the problem arises in systems that have irregular irrigation, for example, golf courses, and municipal water systems where different flow rates are required. Some systems with cycling problems have multiple pump stations which are activated according to the different amounts of water needed. Also a system with cycling problems exists in tall buildings where, because of the building height, it is necessary to have controls for different levels of the building, and different flow rates. The problem also exists in liquid systems other than water. For example, the ordinary gasoline fuel dispenser at an auto service station has an electric motor driven pump which delivers fuel to a small pressure tank, then to a metering device, and then to the manually controlled nozzle. When the auto tank is nearly full the customer will often reduce the flow to a dribble to "top off" the tank. This will cause the motor to cycle on and off.

Constant outlet pressure valves are well known to the art. Such valves are designed to reduce the flow if the outlet pressure is above the optimum range and to completely stop the flow when it exceeds the preset pressure.

Before this invention, attempted solutions to alleviate the cycling problem included installing a small bypass around a constant outlet pressure valve. The valve is installed downstream of the pump and upstream of the reservoir and pressure switch. As an example, if the normal flow is fifteen gallons per minute, the bypass provides a flow of one gallon per minute. Therefore when there is a withdrawal from the reservoir, the liquid will continue to dribble through the bypass and slowly refill the reservoir. When the reservoir is sufficiently full, the pressure switch will shut the motor off. The reservoir will supply the need until the water pressure drops to a level at which the pressure switch closes, starting the pump motor to fill the reservoir. However these bypasses exhibited certain problems. One of which is often the bypass will be noisy because of the pressure of the liquid flowing through a small opening. Also the small opening is susceptible to being clogged by debris.

The constant outlet pressure valves (called the valve device herein) often have a plane (or flat) valve seat seating the surface and a valve seating surface that moves normal to the valve seating surface.

SUMMARY OF THE INVENTION (1) Progressive Contribution to the Art

This invention solves the problem by cutting a notch or groove in one of the seating surfaces, either the valve seat or the movable valve member of the constant pressure outlet valve. Therefore when the valve is closed, the dribble flow is through this notch or groove. Experience has shown that this will not be a noisy flow. Also experience has shown that it will not clog because each time the valve opens any debris which might otherwise collect in the restricted flow device (the notch or groove) is flushed out by the opening of the valve and the flow of liquid across the notch or groove surface.

If the notch or groove is directed to a side of the valve, the water through the notch or groove will erode the side of the valve. This problem is solved by placing the notch or groove so it directs the flow of water through the notch or groove to the outlet of the valve where no damage results.

(2) Objects of this Invention

An object of this invention is to provide a valve device with a modified controlled outlet pressure.

Another object of this invention is to prevent cycling of motors on liquid pumps feeding small reservoirs.

A further object of this invention is to prevent the cycling with a non-clogging dribble flow through a constant outlet pressure valve.

Yet, another object of this invention is to prevent the flow of water through a notch or groove in the valve surface from damaging a housing of the valve.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

CATALOGUE OF ELEMENTS

Figure 1:
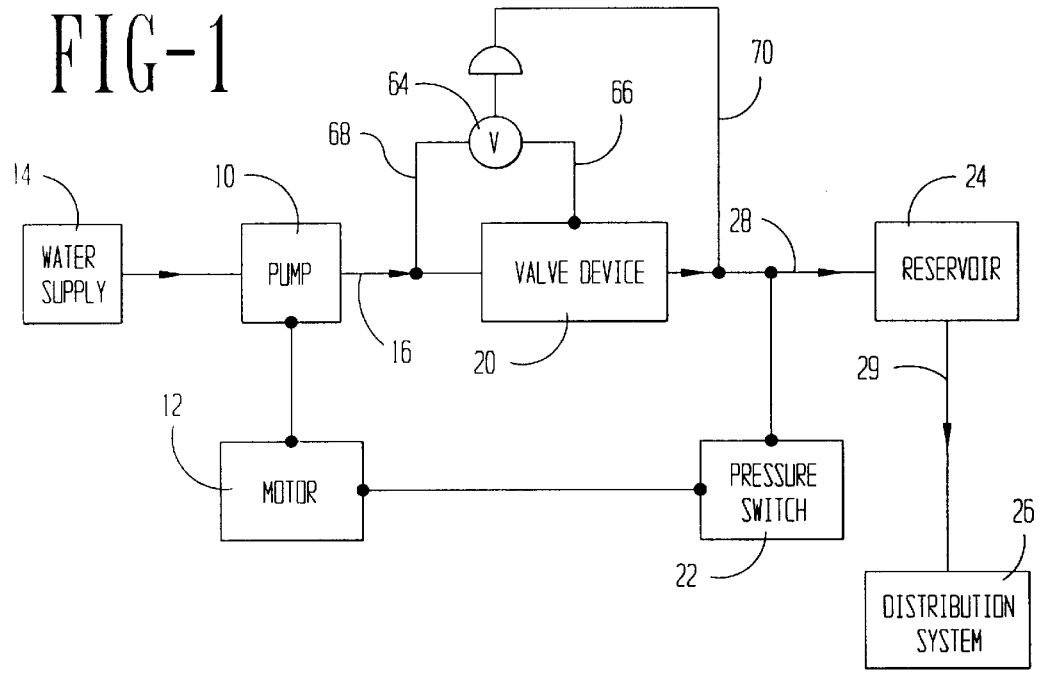
FIG. 1 is a schematic representation of a liquid system using a valve device according to this invention.

As an aid to correlating the terms of the claims to the exemplary drawing(s), the following catalog of elements and steps is provided:

| | |
|---|---|
| 10 | pump |
| 12 | motor |
| 14 | water supply |
| 16 | pipe |
| 20 | valve device |
| 22 | pressure switch |
| 24 | reservoir |
| 26 | distribution system |
| 28 | reservoir entrance pipe |
| 29 | distribution pipe |
| 30 | housing |
| 32 | inlet |
| 34 | outlet |
| 36 | valve seat |
| 38 | seat seating surface |
| 40 | movable valve member |
| 42 | valve seating surface |
| 44 | diaphragm |
| 46 | opening |
| 48 | valve closure section |
| 50 | intermediate flexible section |
| 52 | cylindrical guiding section |
| 54 | cylindrical guiding surface |
| 56 | cover |
| 58 | control chamber |
| 60 | spring |
| 64 | pilot or supplemental control valve |
| 65 | notch or groove |
| 66 | tube |
| 68 | tube |
| 69 | notch or groove |
| 70 | tube |

DESCRIPTION OF THE PREFERRED EMBODIMENT

An embodiment of the valve device according to this invention is designed to work with motor driven pumps which are non-positive displacement. The valves would also work with a positive displacement pump if the pump were powered by a motor which would reduce its speed with increased back pressure on the pump. However usually the valves are used on pumps wherein with the pump's constant velocity, the flow rate of the pump decreases with increased pressure. The most common of pumps of this type are centrifugal pumps. Some of this type are either axial flow pumps (the water flows parallel to the axis of the rotating pump) or at least combined partially centrifugal.

The valve devices of this invention will always include a valve seat and a valve element which moves relative to the valve seat. Often the valve seat and the valve each have a plane surface and the surfaces are always parallel in their relationship. However in some cases the valve surfaces are conical. Also some valves have a toothed surface to cause a spray pattern from the partially opened valve to be a zigzag pattern instead of a flat spray pattern. Also in some cases a butterfly or gate valve is used and the opening and closing of the valve control by a servo motor.

The valve device is basically a constant outlet pressure valve. Upon increase of the downstream pressure, the valve opening is reduced to reduce the flow so that downstream maximum pressure is maintained; and upon reduced downstream pressure the valve opening increases. Normally the flow will be adjusted by having a spring bias the valve element away from the valve seat and the valve element will have a diaphragm wherein the fluid pressure on one side of the diaphragm will force the valve element toward the valve seat. However, as stated before for the butterfly valve, the motor controlling the valve opening can be responsive to a downstream pressure measurement which would control the positioning of the valve through the servo motor. Such valves are known to the valve arts and are commercially available. The programming of the valve to close with additional downstream pressure is within the skill of persons skilled in such art.

Referring to FIG. 1 there may be seen a schematic representation of a water system according to this invention.

Pump 10 connected to motor 12 pumps liquid from a liquid supply which is usually a water supply 14 into pipe 16. With increased pressure in the pipe 16, the pump 10 pumps less water through pipe 16. Centrifugal pumps have this as a inherent characteristic. Also vane pumps with axial flow would have this inherent characteristic. Constant displacement pumps would not have this characteristic; however if the power supply from motor 12 were such that increased load by the pump would reduce the motor speed; this would have the required result. The required result as stated before is that the increased pressure upon pump outlet pipe 16 reduces the volume of flow from the pump.

The motor could be of various types. The water supply could be of any type. It might be an underground well. It might be a low pressure reservoir and the pump was pumping from the reservoir to have the desired outlet pressure of the system.

The outlet of the pipe 16 is connected to valve device 20 that will be described in detail later. The outlet from the valve device is connected to pressure switch 22 and reservoir 24 by reservoir pipe 28. The reservoir is connected to the distribution system 26 by distribution pipe 29. According to this invention, the reservoir is a pressure reservoir. In an elevated tank the water pressure of the reservoir pipe 28 will vary with the height of water in the reservoir. More commonly, according to the use of this invention, the reservoir would be a pressure tank having a compressed air cap which under normal practice would be separated from the water by a flexible bladder. Increase water in the tank compresses the air and increases the pressure on the pipe 28. Such tanks are well known and commercially available on the market.

The distribution system might be any distribution system: a single rural residence; the complete system for a golf course with a club house including showers, kitchens, etc.; a small village; subdivision of a city; the upper floors of a tall building; or for other liquids such as gasoline pumps.

The pressure switch 22 for an electric motor 12 would be a simple switch which at a first preset condition, namely low pressure provides electrical power to the motor 12 and at a second preset condition, namely high pressure would cut off the electric power to the motor 12. Such switches are well known and commercially available on the market. If the motor 12 were an internal combustion engine, the pressure switch 22 might remain the same but the control for the motor would be required to have automatic starting control at the low pressure output from the pressure switch 22 and also have a shut-off control responsive to the high pressure output from the pressure switch 22. Such motor controls are also well known and commercially available. A check valve (not shown) in pipe 16 prevents liquid from flowing back into the water supply 14 when the pump is not operating.

Figure 2:
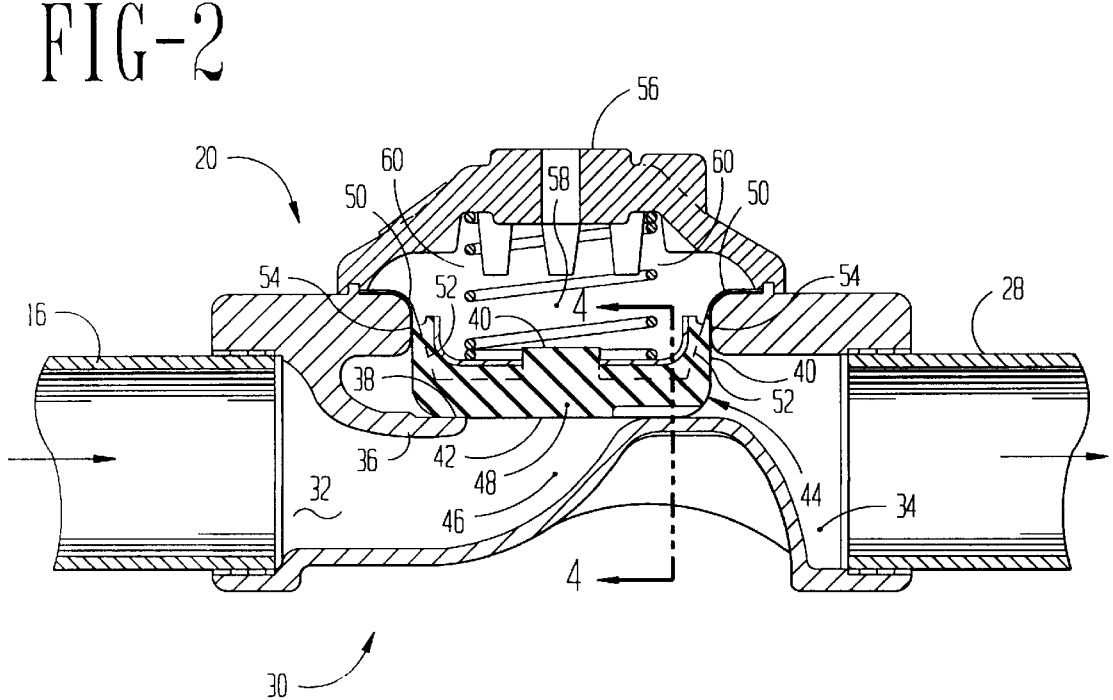
FIG. 2 is a sectional representation somewhat schematic of a valve device according to this invention.

FIG. 2 illustrates a valve device 20 with housing 30. The housing 30 has an inlet 32 and an outlet 34 divided by valve seat 36. The inlet 32 is connected to the pump outlet pipe 16. The outlet 34 is connected to the reservoir pipe 28. The valve seat 36 has a seat seating surface 38. The seat seating surface lies in a plane. The valve has a movable valve member 40 which has a valve member seating surface 42. The valve seating surface 42 lies in a plane which plane is parallel to the seat seating surface 38. The valve member 40 is movable or displaceable.

In the valve illustrated in FIG. 2 the valve member includes a diaphragm 44 within the housing 30. The diaphragm includes an open peripheral section secured to an opening 46 in the housing in alignment with the valve seat. The diaphragm 44 also has a valve closure section 48. The valve closure section is also displaceable with respect to the valve seat for controlling the flow of fluid through the passageway surrounded by the valve seat. An intermediate flexible section 50 of the diaphragm permits the displacement of the valve closure section 48. The diaphragm also includes a cylindrical guiding section 52 between the valve closure section 48 and the intermediate flexible section 50.

The valve closure section 48 includes the valve seating surface. The valve seating surface 42 contacts the seat seating surface 38 when the valve member is fully closed.

The housing 30 includes a cylindrical guiding surface 54 for guiding the movement of said valve closure section of the diaphragm. Said housing also includes a cover 56 defining a control chamber 58. The control chamber 58 is between the cover 56 and the diaphragm 44. Spring 60 extends between the cover 56 and the diaphragm 44. The valve described is a slight modification of the valve shown in U.S. Pat. No. 5,464,064.

Referring again to FIG. 1, pilot or supplemental control valve 64 is fluidly connected by tube 66 to the control chamber 58 of the control valve 20. The pilot valve 64 is also connected by a tube 68 to the pipe 16. The pilot valve 64 controls the flow of water according to the pressure upon the reservoir pipe 28 which is sensed through tube 70. When the pressure in pipe 28 increases beyond the preset pressure it will cause the pilot valve 64 to direct the pressure from pipe 16 to increase the pressure in the control chamber 58. This increase pressure in the control chamber 58 will move the valve member 40 into a fully closed position. Reduction of pressure in the pipe 28 will cause the pilot valve 64 to reduce the pressure in the control chamber 58 so that the control valve 20 opens and remains open until the pressure in pipe 28 again reaches the preset pressure. This modulating maintains a constant pressure in pipe 28.

The other characteristics of closing the valve 40 will be determined by the design of elements of the valve device 20. Such design elements as changing the strength of the spring 60 and the design of the pilot valve 64 will govern the characteristics of the system. The valve member 40 may be designed to go from a fully closed position to a fully open position within a 5 lb. range. That is, it could be designed so that at a pressure of 50 p.s.i. at outlet 34 would fully close the valve member 40 but at a pressure of 45 p.s.i. at the outlet 34 would fully open the valve member 40. A different design could result in a one pound range for example.

Those skilled in the art will understand that the structure described to this point is old and well known. All parts and elements thereof are commercially available on the market. Also it will be understood that valve device 20 as described at this point is commonly known as a pressure reducing valve or a constant outlet pressure valve.

According to this invention a notch or groove is cut into one of the valve seating surfaces. As illustrated in FIGS. 2 and 4, the notch or groove 65 is cut into the valve seating surface 42 of the valve element 40. However notch or groove 69 could also be cut into the seating surface 38 of the valve seat as illustrated in FIGS. 3 and 5.

The size of the notch or groove would normally be controlled by many factors. For example, if the pump motor were a submergible motor attached to a submergible pump located in the bottom of a well, it would be necessary that the flow of the water through the notch or groove be sufficient to adequately cool the motor over an extended period of time. Also the relative size of the reservoir to the pump capacity would enter into the design factors. If the system were designed so that the distribution system would operate at a pressure from 50 p.s.i. to 30 p.s.i. then the pressure switch would be set to turn on at 30 p.s.i. and off at 50 p.s.i. If the pump had a capacity of 15 gallons per minute at 50 p.s.i., the reservoir could have a capacity of 5 gallons. The term the "capacity of the reservoir" is meant to indicate in such a case that at 30 p.s.i. it would have a minimum amount of water and at 50 p.s.i. it would have a maximum amount of water. That is to say that the reservoir system would be such that if it was full at 50 p.s.i. that the reservoir could deliver at least 5 gallons before the pressure switch would start the pump motor at 30 p.s.i. If no valve device 20 were present, it will be seen that when the motor turned on, and if the flow from the reservoir was 5 gallons per minute, that the motor would run for less than a minute. In less than a minute, the pump would deliver about 5 gallons to the reservoir, and deliver 5 gallons to the distribution system. The 5 gallons forced into the reservoir would cause it to reach its 50 p.s.i. and shut down the pump. Then within a minutes time, the reservoir would be empty and it would turn on again. That is to say if there were a continual flow of water from the distributing system of 5 gallons per minute, that the motor would go through a complete cycle of turning on and turning off and turning on again in less than two minutes without a valve device.

However it may be seen that if the notch or groove in the valve were set to flow one gallon a minute (about 7% of full capacity) and the fully closed position of the valve device is 30 p.s.i. that the pump would continue to operate if there were water usage of one gallon a minute or greater. If the water usage were below one gallon per minute, it could be calculated the length of time that the motor would run and be off. If the distribution system had a very small leak, for example, a rate of a half a gallon a minute and the notch or groove was cut to flow one gallon a minute, the pump would run for at least ten minutes to refill the tank and be off for at least ten minutes while the tank again drained. This would result in the pump going through a complete cycle in twenty minutes. Analysis shows that if the water usage was more or less than one half the notch or groove size that the cycle would not be shorter.

Figure 3:
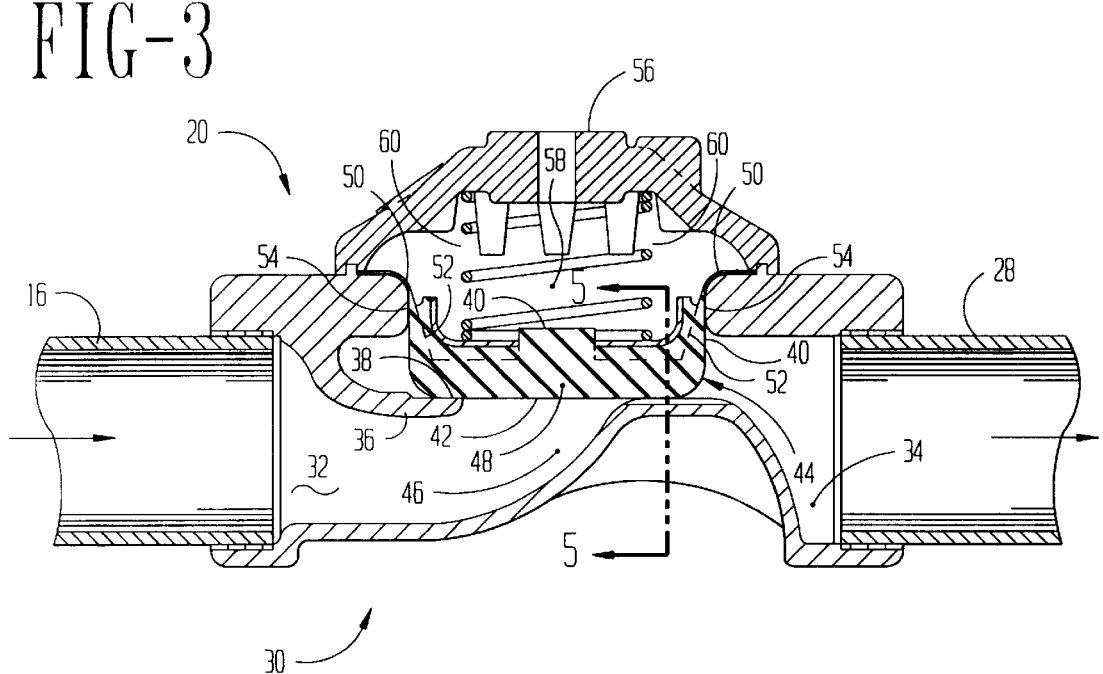
FIG. 3 is a representation similar to FIG. 2 showing a second embodiment.
Figure 4:
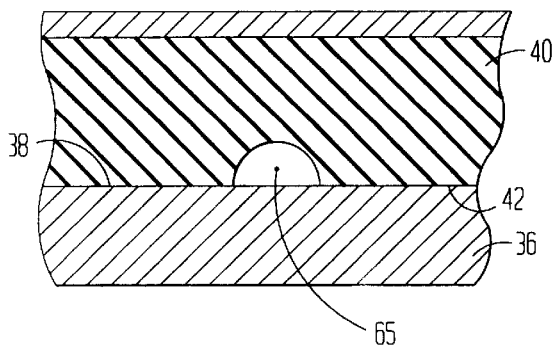
FIG. 4 is an enlarged detail taken substantially on line 4—4 of FIG. 2 of the valve seat and valve element of the valve device shown in FIG. 2.
Figure 5:
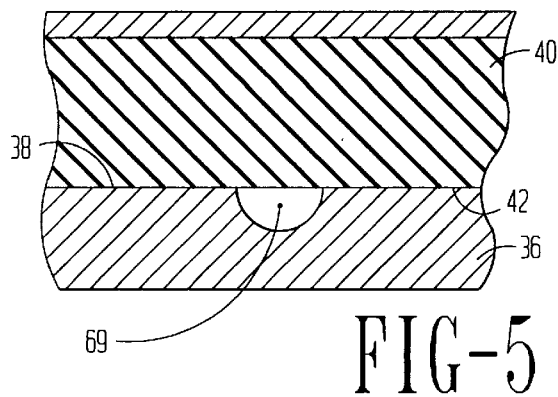
FIG. 5 is an enlarged detail similar to FIG. 4 taken substantially on line 5—5 of FIG. 3.

FIGS. 3 and 5 show a second embodiment of this device. The second embodiment is strikingly similar to FIGS. 2 and 4 except that in this embodiment the notch or groove 69 is cut in the valve housing 30 seating surface 36 rather than the moveable valve member 40. FIG. 5 shows the notch 69 cut in the valve seat 36 which can then be easily contrasted with FIG. 4 showing the notch 65 cut in the valve member 40. This second embodiment shows that if over time the notch or groove 69 is washed out, becomes larger because of erosion caused by the water and entrained particles therein, repair may only be had by replacing the valve housing 30. Contrasted to the embodiment of FIGS. 2 and 4, if the notch 65 washes out, repair may be had by replacing the valve member 40.

The embodiments shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

What is claimed is:

1. A combination of a motor, a pump, a diaphragm valve and a pressure switch comprising:
   a motor drivingly connected to a pump, the pump connected by a pipe to a diaphragm valve, the diaphragm valve connected by a reservoir pipe to a reservoir, the reservoir connected by a distribution pipe to the distribution system, and a switch connected to the reservoir pipe and to the motor;
   i) the diaphragm valve having:
   a) a housing having an inlet, and outlet, and a passageway circumscribed by a valve seat having a seat sealing surface for the flow of fluid from the inlet to the outlet;
   b) and a valve member including a diaphragm within said housing and displaceable towards or away from said valve seat to control the flow therethrough;
   c) said diaphragm including an outer peripheral section secured over an opening in the housing in alignment with said valve seat, a valve-closure section having a perimeter and center area, the valve-closure section displaceable with respect to the valve seat for controlling the flow therethrough, and an intermediate flexible section permitting the displacement of said valve-closure section,
   d) said valve-closure section including a valve seating surface surrounding the center area which contacts the valve seat when the valve member is fully closed;
   e) said housing further including a cover defining a control chamber between the cover and the diaphragm; and
   f) a spring between the cover and the diaphragm;
   ii) a supplement control valve;
   iii) a tube fluidly connecting the supplemental control valve to the control chamber;
   iv) said tube and said spring being elements of means for fully closing the sealing surface against the valve seat; and
   v) a notch in said valve-closure section, said notch extending from the perimeter of the valve-closure section across the sealing surface and into the center area.

2. The combination as defined in claim 1, wherein said diaphragm is a single unit of elastomeric material integrally formed with said outer peripheral section, valve-closure section, and intermediate flexible section.

3. The combination as defined in claim 1 wherein said notch has a fluid passage therethrough when the valve is fully closed.

4. The combination as defined in claim 1 wherein the notch is on that portion of the valve-closure section adjacent the outlet.

5. The combination as defined in claim 1, wherein said diaphragm valve-closure section is thicker than its other sections so as to be substantially rigid and to provide a sealing surface with respect to said valve seat.

6. The combination as defined in claim 1, wherein said valve member further includes a rigid insert having a cylindrical side wall engaging the inner surface of said cylindrical guiding section of the diaphragm, a circular end wall engaging the inner surface of said valve-closure section of the diaphragm, and a cylindrical guiding section between the valve-closure section and the intermediate flexible section.

7. The combination as defined in claim 6 wherein,
   said diaphragm is a single unit of elastomeric material integrally formed with said outer peripheral section, valve-closure section, and an intermediate flexible section, said notch has a fluid passage therethrough when the valve is fully closed.

8. The combination as defined in claim 7 wherein,
   the notch is on that portion of the valve-closure section adjacent the outlet; and
   said diaphragm valve-closure section is thicker than its other sections so as to be substantially rigid and to provide a sealing surface with respect to said valve seat.

9. The combination as defined in claim 1 wherein,
   the notch is on that portion of the valve-closure section adjacent the outlet; and
   said valve member further includes a rigid insert having a cylindrical side wall engaging the inner surface of said cylindrical guiding section of the diaphragm, a circular end wall engaging the inner surface of said valve-closure section of the diaphragm, and a cylindrical guiding section between the valve-closure section and the intermediate flexible section.

10. The combination as defined in claim 9 further comprising: said diaphragm is a single unit of elastomeric material integrally formed with said outer peripheral section, valve-closure section, and an intermediate flexible section; said notch has a fluid passage therethrough when the valve is fully closed; and said diaphragm valve-closure section is thicker than its other sections so as to be substantially rigid.

11. The combination as defined in claim 3:
    wherein said passage is large enough to flow sufficient liquid to prevent damage to the motor.

12. The combination as defined in claim 10 wherein said passage is large enough to flow sufficient liquid to prevent damage to the motor.

13. A liquid system comprising:
    a diaphragm valve for controlling the flow of liquid from a motor driven pump to a distribution system,
    said diaphragm valve having:
    a) a housing having an inlet, and outlet, and a passageway circumscribed by a valve seat having a seat sealing surface for the flow of fluid from the inlet to the outlet;
    b) and a valve member including a diaphragm within said housing and displaceable towards or away from said valve seat to control the flow therethrough;
    c) said diaphragm including an outer peripheral section secured over an opening in the housing in alignment with said valve seat, a valve-closure section having a perimeter and center area, the valve-closure section displaceable with respect to the valve seat for controlling the flow therethrough, and an intermediate flexible section permitting the displacement of said valve-closure section, d) said valve-closure section including a valve seating surface surrounding the center area which contacts the valve seat when the valve member is fully closed;

e) said housing further including a cover defining a control chamber between the cover and the diaphragm; and f) a spring between the cover and the diaphragm;

said liquid system including:

g) a motor drivingly connected to, h) a liquid pump, i) the diaphragm valve is connected downstream of the pump, j) a reservoir connected downstream of the diaphragm valve, k) a switch means for starting the motor at a first preset condition and for stopping the motor at a second preset condition, said switch means connected downstream of the diaphragm valve, l) said pump having a flow capacity at said second preset condition m) a distribution system connected to the reservoir downstream thereof; and n) a notch in one of the sealing surfaces, o) said notch forms a liquid passage across the sealing surfaces when the valve is fully closed.

14. The liquid system as defined in claim 13 wherein said passage is large enough to flow sufficient liquid to prevent damage to the pump.

15. The liquid system as defined in claim 13 wherein the notch is on that portion of the valve closure section adjacent the outlet.

16. The liquid system as defined in claim 15 wherein said passage is large enough to flow sufficient liquid to prevent damage to motor.

* * * * *